US010251338B2

(12) United States Patent
Zenkus et al.

(10) Patent No.: US 10,251,338 B2
(45) Date of Patent: Apr. 9, 2019

(54) BALANCED HOUSING CONSTRUCTION FOR FLEXIBLE LINE TRIMMER HEAD AND APPARATUS FOR FORMING THE HOUSING

(71) Applicant: Echo Incorporated, Lake Zurich, IL (US)

(72) Inventors: Joseph John Zenkus, Lake in the Hills, IL (US); Stephen J. Towner, Gurnee, IL (US); Ryan Garrett, Buffalo Grove, IL (US)

(73) Assignee: Echo Incorporated, Lake Zurich, IL (US)

( * ) Notice: Subject to any disclaimer, the term of this patent is extended or adjusted under 35 U.S.C. 154(b) by 169 days.

(21) Appl. No.: 15/441,921

(22) Filed: Feb. 24, 2017

(65) Prior Publication Data

US 2018/0242518 A1    Aug. 30, 2018

(51) Int. Cl.

| B29C 45/00 | (2006.01) |
|---|---|
| A01D 34/416 | (2006.01) |
| B29C 45/18 | (2006.01) |
| B29C 33/00 | (2006.01) |
| B29C 45/37 | (2006.01) |
| B29C 45/80 | (2006.01) |
| B29L 31/00 | (2006.01) |

(52) U.S. Cl.
CPC ...... *A01D 34/4161* (2013.01); *B29C 33/0066* (2013.01); *B29C 45/0025* (2013.01); *B29C 45/1808* (2013.01); *B29C 45/376* (2013.01); *B29C 45/80* (2013.01); *B29C 2945/7613* (2013.01); *B29C 2945/76568* (2013.01); *B29L 2031/72* (2013.01)

(58) Field of Classification Search
CPC ........... B29C 45/0025; B29C 45/1808; B29C 45/376
See application file for complete search history.

(56) References Cited

U.S. PATENT DOCUMENTS

| 5,409,656 A * | 4/1995 | Naruse ............. B29C 45/14065 249/137 |
|---|---|---|
| 6,168,734 B1 * | 1/2001 | Botros ................. F04D 29/662 249/155 |
| 6,952,877 B2 * | 10/2005 | Pfaltzgraff ......... A01D 34/4163 30/276 |

* cited by examiner

*Primary Examiner* — James Sanders
(74) *Attorney, Agent, or Firm* — Wood, Phillips, Katz, Clark & Mortimer

(57) ABSTRACT

An apparatus for forming a first component making up at least a part of a housing on a trimmer head and a method of using the apparatus. The housing has a rotary axis and is configured to support at least one radially projecting cutting component. The first component has a central axis. A forming unit defines at least one cavity within which a moldable material is confined to produce at least a part of a wall on the first component that extends around the rotary axis. The forming unit is configured to allow selective controlling of a quantity of a moldable material introduced into a first discrete subvolume at a first location in the one cavity to thereby allow selective controlling of a mass of a portion of the at least part of the wall formed by the moldable material in the one cavity at the first location to facilitate dynamic balancing of the housing, within which the first component is incorporated, with respect to the rotary axis.

5 Claims, 8 Drawing Sheets

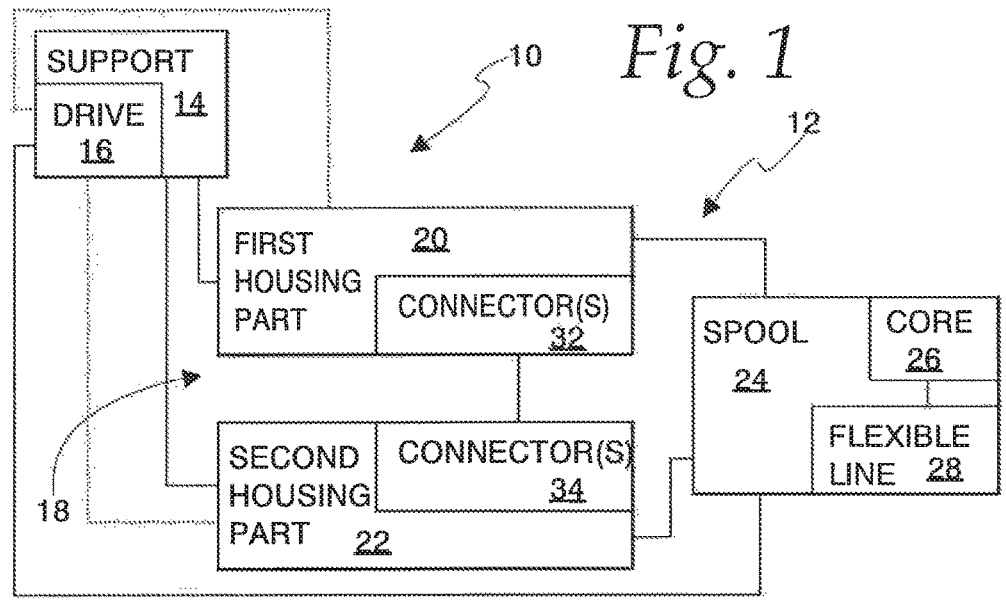
Fig. 1
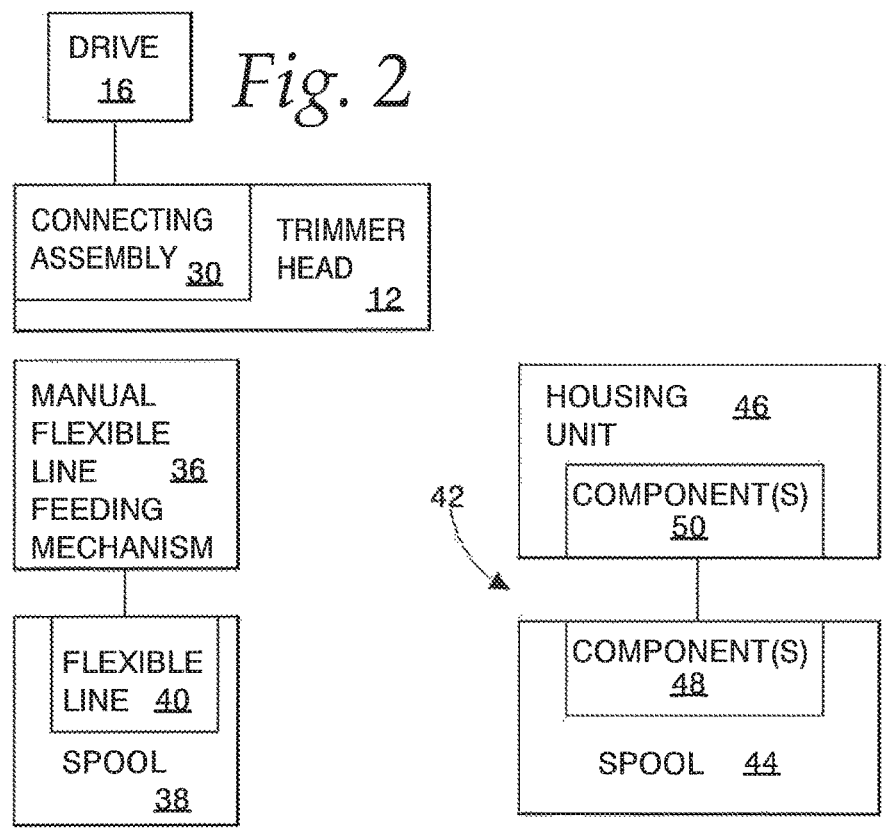
Fig. 2
Fig. 3
Fig. 4

BALANCED HOUSING CONSTRUCTION FOR FLEXIBLE LINE TRIMMER HEAD AND APPARATUS FOR FORMING THE HOUSING

BACKGROUND OF THE INVENTION

Field of the Invention

This invention relates to flexible line trimmers and, more particularly, to a flexible line trimmer having a rotary housing containing a supply of flexible line and from which a discrete length of the line projects to effect cutting as the housing turns.

Background Art

A multitude of flexible line trimmers incorporate a rotatable housing from which one or more cutting components project. As the head is driven around its axis, the cutting components effect severance of vegetation, and the like.

The cutting components may take a variety of different forms. In one common construction, a supply of flexible line is wrapped around a core and has one or more ends that project radially from the housing.

Other designs utilize individual strands or other components that can be mounted to effect cutting in substantially the same manner.

With the exemplary wrapped cutting line arrangement, the supporting housing is normally made with separable parts. As one example, housing halves may be used to capture a spool. By separating the housing halves, the spool can be initially installed and thereafter accessed so that it might be replaced or a line supply may be replenished thereon.

An exemplary form of this construction is shown in U.S. Pat. No. 6,952,877, to Pfaltzgraff. In the depicted form, the housing halves are snap fit using cooperating latch components at diametrically opposite locations. With the housing halves joined, a user can manually deform certain of the latch components in a manner that allows the housing halves to be drawn axially away from each other.

For the convenience of the user, the housings have been constructed with a symmetrical configuration so that the user can align the latch components with the housing parts in two different relationships.

This type of trimmer head is generally common to all categories of these tools, be they for homeowners or landscape professionals. Since the requirement to replenish line results in down time, those using line trimmers professionally prefer to have a greater line storage capacity. Such larger capacity line storage heads have been commercially available for many years.

Inherent in the larger housing designs is the problem of maintaining a dynamic balance. Larger masses with a greater radial extent exaggerate the effects of manufacturing tolerances that in a smaller design would be potentially limited or even negligible. This problem is compounded by the speeds at which current trimmer heads are operated to allow for efficient cutting.

Heretofore, the balance problem has been addressed by focusing on controlling tolerances in the design and manufacturing processes for the housing parts. These efforts have generally reduced but not eliminated imbalances which reflect as vibrations detectable by a user during operation. In an extreme case, these vibrations can progressively increase over the lifetime of a product and could potentially lead to part failure.

The above problems are aggravated by the use of lightweight, non-metal materials to produce the housing parts through conventional molding equipment and techniques.

First of all, it is always difficult to maintain close tolerances with a molded part made using a plastic or composite. This problem is aggravated by the fact that the joined parts, with a conventional construction, are prone to skewing during normal operation, as when they are impacted and/or operated under heavy load and at high speeds. This skewing may produce part deformations that affect balance. Joined, non-metal parts also tend to abrade and weld as equipment is utilized, which conditions produce further dynamic imbalance.

Still further, from the point of initial manufacture, it may be very difficult to engineer tooling to produce well-balanced, fixed configuration parts and that maintains the same targeted balance characteristics for generated parts as the tooling is used extensively and subject to normal wear and reconfiguration.

Further, well-engineered tooling may still produce parts that are less than ideally balanced. Once investment in tooling is made for a fixed part configuration, modifications thereto are impractical and at best expensive.

The balance problem is still further aggravated by the ability of a user to assemble housing parts in different manners. Engineers may initially design parts and tooling therefor so that optimal balance results, regardless of how the housing parts are connected. However, on a practical level, variations occur that are uncontrollable and may be attributable to manufacturing methods, manufacturing environments, and/or unusual properties of a particular material molded using the fixed tooling. Thus, housings with parts assembled in different manners, as permitted by their design, may not have the same mass distribution.

These problems become even more pronounced as the size of the trimmer heads increases to provide greater capacity for a stored supply of cutting line. In spite of this issue, the industry has continued to use the same basic designs and manufacturing equipment and techniques to produce trimmer head components. Improvements in this area could significantly distinguish products in a highly competitive marketplace.

SUMMARY OF THE INVENTION

In one form, the invention is directed to an apparatus for forming a first component making up at least a part of a housing on a trimmer head. The housing has a rotary axis and is configured to support at least one radially projecting cutting component that effects cutting as the housing is turned around the rotary axis. The first component has a central axis. The apparatus has a first forming unit defining at least one cavity within which a moldable material is confined to produce at least a part of a wall on the first component that extends around the rotary axis. The first forming unit is configured to allow selective controlling of a quantity of a moldable material introduced into a first discrete subvolume at a first location in the one cavity to thereby allow selective controlling of a mass of a portion of the at least part of the wall formed by the moldable material in the one cavity at the first location to facilitate dynamic balancing of the housing within which the first component is incorporated with respect to the rotary axis.

In one form, the first forming unit is configured to allow selective controlling of a quantity of a moldable material introduced into a second discrete subvolume at a second location in the at least one cavity.

In one form, the second location is diametrically opposite the first location.

In one form, the first forming unit is configured to allow selective controlling of quantities of a moldable material introduced into a plurality of discrete subvolumes in the at least one cavity in addition to the first discrete subvolume, each at locations spaced from the location of the first subvolume and the locations of the other of the plurality of discrete subvolumes.

In one form, the first location and plurality of locations are circumferentially spaced equidistantly around the central axis of the first component.

In one form, the first forming unit is configured to allow selective controlling of quantities of a moldable material into at least eight discrete subvolumes in the at least one cavity.

In one form, the first forming unit is configured so that the wall on the first component extends continuously around the central axis of the first component.

In one form, the first forming unit has a frame and at least a first pin configured and connected to the frame so that the first pin can be selectively moved relative to the frame to thereby occupy different volumes within the at least one cavity as an incident of which the moldable material is introduced to the at least one cavity in different quantities.

In one form, the apparatus is provided in combination with a second forming unit defining at least a second cavity within which a moldable material is confined to produce at least a part of a wall on a second component having a central axis. The second forming unit is configured to allow selective controlling of a quantity of moldable material into a first discrete subvolume at a first location in the second cavity to thereby allow selective controlling of a mass of a portion of at least part of the wall formed by the moldable material in the second cavity at the first location in the second cavity to facilitate dynamic balancing of the housing within which the second component is incorporated with respect to the rotary axis. The first and second forming units are configured so that the first and second components are configured to be joinable to each other to make up at least a part of the trimmer head housing.

In one form, the second forming unit is a part of the apparatus.

In one form, the invention is directed to a method of making at least a part of a trimmer head housing. The method includes the steps of: obtaining an apparatus as described above; forming a moldable material in the at least one cavity with the first forming unit in a first state wherein the first discrete subvolume receives either: a) none of the moldable material; or b) a first quantity of the moldable material to produce one form of the first component; measuring a dynamic balance state of the one form of the first component with respect to the central axis of the one form of the first component; and based upon the measured dynamic balance state of the one form of the first component, either: a) leaving the first forming unit in the first state; or b) changing the first forming unit from the first state into a second state wherein the first discrete subvolume receives a different quantity of the moldable material than received with the first forming unit in the first state to thereby produce a second form of the first component.

In one form, the method further includes the step of combining the one form of the first component with at least one other component forming a part of the trimmer head. The step of measuring a dynamic balance state of the one form of the first component consists of measuring a dynamic balance state of the one form of the first component with the one form of the first component combined with the at least one other component.

In one form, the method of making at least a part of a trimmer head housing further includes the steps of: obtaining the second forming unit described above; forming a moldable material in the at least second cavity with the second forming unit in a first state wherein the first discrete subvolume in the second cavity receives either: a) none of the moldable material; or b) a second quantity of moldable material to produce one form of the second component; measuring a dynamic balance state of the one form of the second component with respect to the central axis of the one form of the second component; and based upon the measured dynamic balance state of the one form of the second component, either: a) leaving the second forming unit in its first state; or b) changing the second forming unit from its first state into a second state wherein the first discrete subvolume in the second cavity receives a different quantity of moldable material than received in the first discrete subvolume in the second cavity with the second forming unit in its first state to thereby produce a second form of the second component.

In one form, the method further includes the step of operatively joining the first form of the first component and the first form of the second component. The step of measuring the dynamic balance states of the one form of the first component and one form of the second component involves measuring the dynamic balance states with the one form of the first component and one form of the second component separated from each other.

In one form, the method further includes the step of operatively joining the first form of the first component and the first form of the second component. The step of measuring the dynamic balance states of the one form of the first component and one form of the second component involves measuring the dynamic balance states with the one form of the first component and one form of the second component operatively joined to each other.

The invention is also directed to the first component made with the apparatus described above.

In one form, the first component is provided in combination with a second component. Each of the first and second components has a cup-shaped configuration and is configured to be releasably connected to each other.

In one form, the first and second components are provided in further combination with a spool having a core around which a supply of flexible cutting line is wrapped. The spool is captively maintained between the first and second components with the first and second components connected to each other.

In one form, the first and second components are configured to be releasably snap-connected to each other.

In one form, the second component is made with the second forming unit described above.

BRIEF DESCRIPTION OF THE DRAWINGS

FIG. 1 is a schematic representation of a flexible line trimmer incorporating a trimmer head, according to the present invention;

FIG. 2 is a schematic representation of connecting structure between a drive and the trimmer head in FIG. 1;

FIG. 3 is a schematic representation of a structure for manually extending line from a spool on the inventive trimmer head in FIG. 1;

FIG. 4 is a schematic representation of a structure for automatically extending line from the spool;

DETAILED DESCRIPTION OF THE PREFERRED EMBODIMENT

Figure 5:
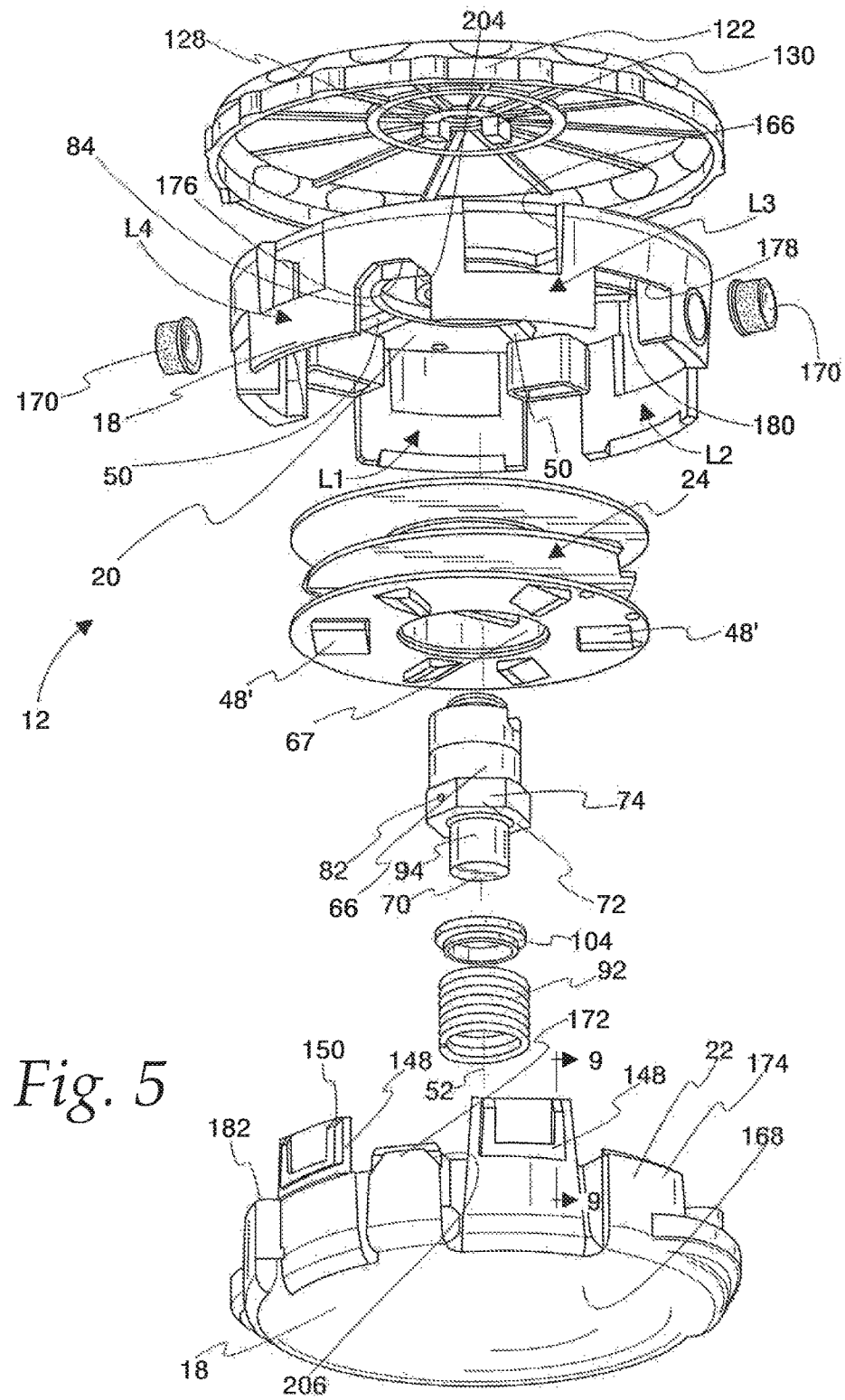
FIG. 5 is an exploded, perspective view of one exemplary form of the inventive trimmer head, as shown in schematic form in FIG. 1.

In FIG. 1, a schematic representation of a flexible line trimmer is shown at 10, including a rotatable trimmer head, according to the invention, at 12. The head 12 is mounted on a support 14, which represents a multitude of different types of support that currently exist. The support 14 might be a wheeled carriage, a frame that is part of a portable unit that can be carried by a user, etc. The support 14 incorporates a suitable drive 16 for the trimmer head 12.

The trimmer head 12 consists of a housing 18 made up of a first part/component 20 and a second part/component 22. The housing 18 has an operating axis around which it moves when powered by the drive 16.

The trimmer head 12 further includes a spool 24 with a core 26 around which a supply of flexible line 28 is wrapped.

The first and second housing parts 20, 22 are configured to be moved axially relative to each other between: a) a first state wherein the first and second housing parts 20, 22 are separated from each other; and b) a second state wherein the first and second housing parts 20, 22 are operatively connected.

The housing 18 and spool 24 are configured so that the spool 24: a) is maintained in an operative position on the housing 18 with the first and second housing parts 20, 22 in the second state; and b) can be separated from the housing 18 with the first and second housing parts 20, 22 in the first state.

As shown additionally in FIG. 2, the trimmer head 12 further includes a connecting assembly 30 configured to be engaged by the drive 16 that is operated to cause the housing parts 20, 22 in their second state to be driven, direct or indirectly, around the operating axis.

The first and second housing parts 20, 22 respectively have connectors 32, 34 that cooperate in pairs at at least three different locations. At each location, the connector pairs 32, 34 are configured to block movement of the first and second housing parts 20, 22 axially away from each other with the first and second housing parts 20, 22 in their second state.

Each of the locations where the connector pairs 32, 34 interact is spaced: a) radially from the operating axis; and b) in a circumferential direction from the other locations.

The schematic showing of the flexible line trimmer 10 in FIGS. 1 and 2 is intended to encompass a wide range of different constructions into which the present invention can be incorporated. The invention contemplates many variations in the basic components depicted as well as their interactions. The construction described hereinbelow is intended to be representative in nature only.

To understand the invention, it is not necessary to understand many details of the trimmer head construction. An exemplary trimmer head, consistent with the basic design of the exemplary unit described hereinbelow, is described in Applicant's U.S. Pat. No. 6,952,877, with inventor Pfaltzgraff. The entire disclosure in U.S. Pat. No. 6,952,877 is incorporated herein by reference.

It should be noted that the invention can be incorporated into a trimmer head that requires manual feeding out of flexible line or one that has one of a potentially wide range of different feeding mechanisms that extend line out automatically, including those that require impacting of the trimmer head upon a hard surface to effect controlled incremental line feeding as the trimmer head is rotated in operation.

In FIG. 3, a manual flexible line feeding mechanism is shown schematically at 36 in association with a spool 38 upon which a supply of flexible line 40 is wrapped.

In FIG. 4, a schematic representation of an automatic line feed mechanism, usable as part of the present invention, is shown in schematic form at 42. The mechanism 42 has a spool 44 that interacts with a housing unit 46 made up of first and second housing parts, as depicted in FIG. 1. Components 48, 50, respectively on the spool 44 and housing unit 46, cooperate and are configured to allow incremental turning of the housing unit 46 relative to the spool 44 upon the housing unit 46 and spool 44 being momentarily axially moved relative to each other as the housing unit 46 is being turned/rotated by the drive 16.

Figure 8:
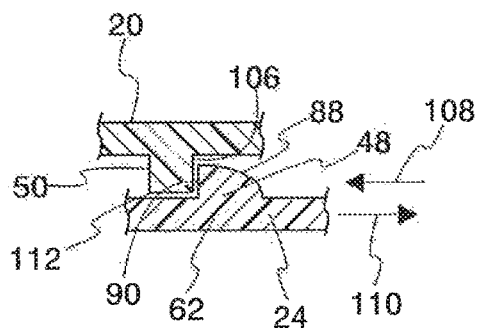
FIG. 8 is a fragmentary, cross-sectional view showing cooperation between components, as shown schematically in FIG. 4.

The particular details of line feeding mechanism are not critical to the present invention as the invention can be incorporated into any structure that has either a manual line feed capability, as shown schematically in FIG. 8, or an automatic feed capability, as shown schematically in FIG. 4 and in Pfaltzgraff's U.S. Pat. No. 6,952,877.

Details of one preferred form of the invention, within the schematic showings in FIGS. 1-4, will now be described with respect to FIGS. 5-12.

The depicted line trimmer head 12 has the aforementioned housing 18 with first and second parts 20, 22, respectively. In most designs, the first housing part 20 is an "upper" part and the second housing part 22 is a "lower" part. The housing 18 has an operating axis 52.

The flexible line 28 is wrapped around the core 26 on the spool 24. The spool 24 has a dividing flange 56 which bounds separate, axially spaced, line storage spaces 58, 60, respectively in conjunction with upper and lower flanges 62, 64.

Figure 6:
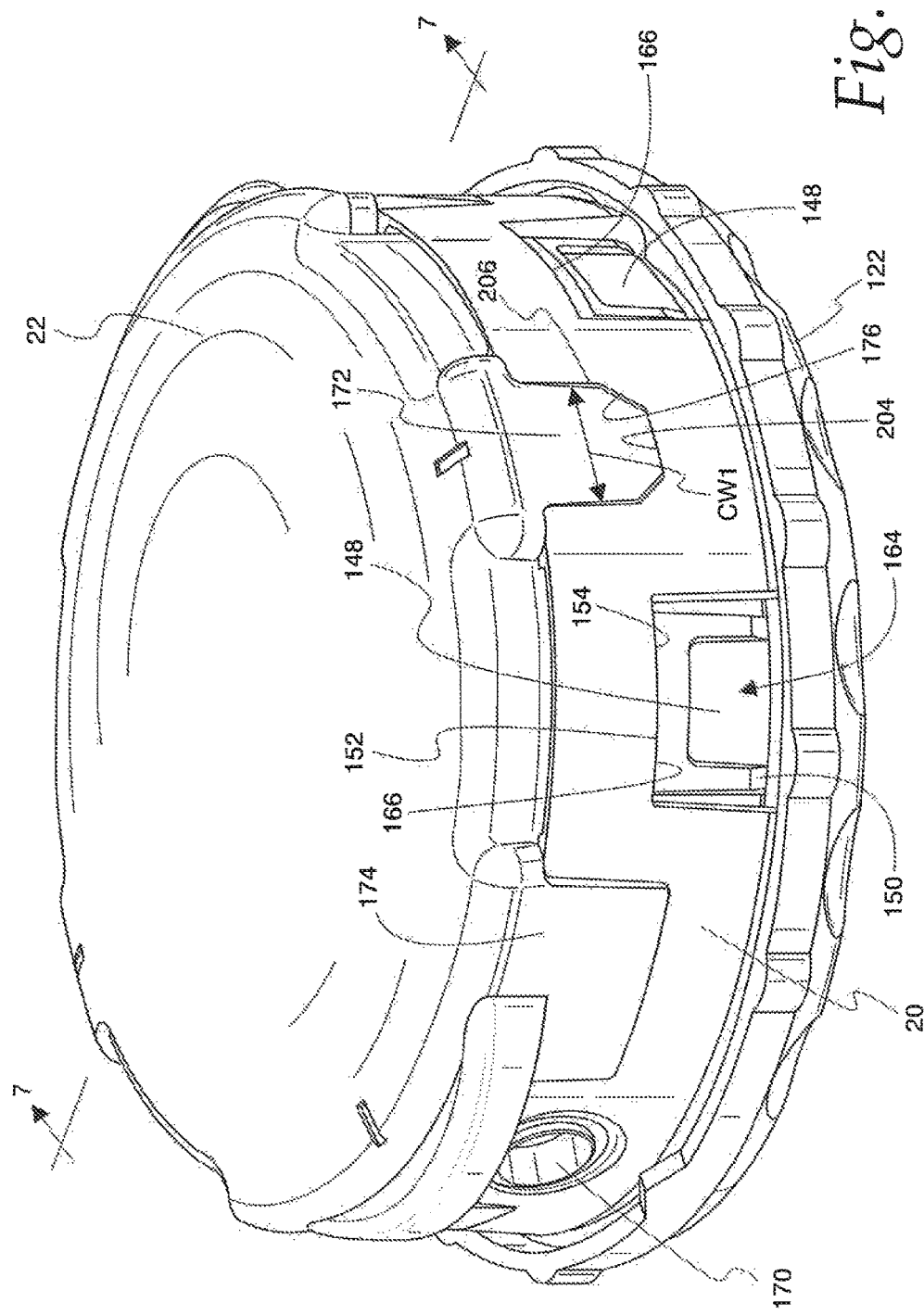
FIG. 6 is an enlarged, bottom, perspective view of the trimmer head in FIG. 5 in an assembled state.
Figure 7:
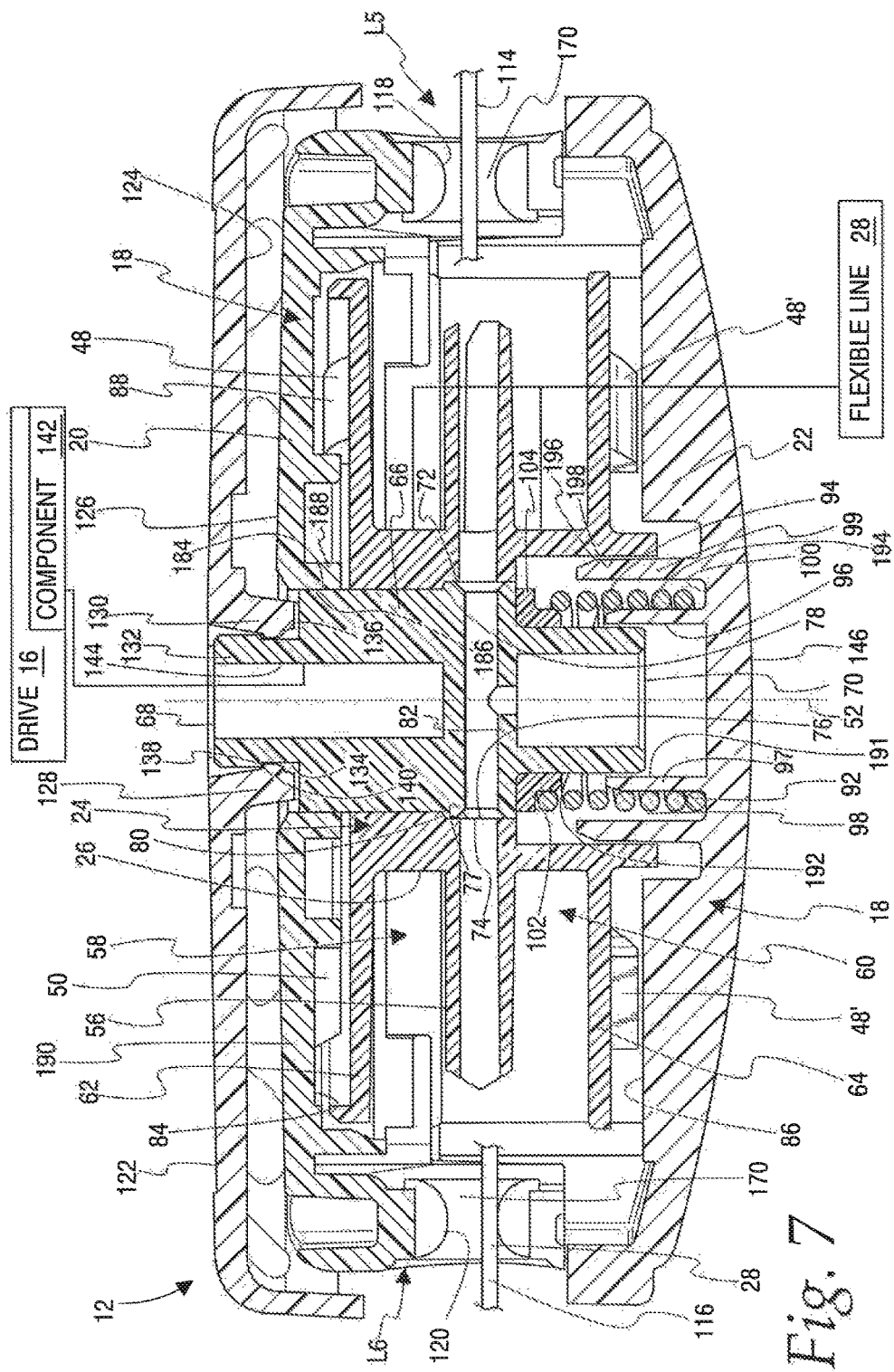
FIG. 7 is a cross-sectional view of the trimmer head taken along line 7-7 of FIG. 6.

As described above, the first and second housing parts 20, 22 have first and second states—a first state as shown in FIG. 5, wherein the first and second housing parts 20, 22 are separated from each other, and a second state, as shown in FIGS. 6 and 7, wherein the first and second housing parts 20, 22 are operatively connected.

As seen in FIG. 7, with the first and second housing parts 20, 22 in their second state, the operatively positioned spool 24 is captively maintained in an operative position. As seen in FIG. 5, with the first and second housing parts 20, 22 in their first state, the spool 24 can be separated from the housing 18 or positioned for assembly.

In this embodiment, the head 12 includes a unitary shaft 66 that extends between the first and second housing parts 20, 22 and through an axial bore 67 through the spool 24. The shaft 66 has axially opposite ends 68, 70. The shaft 66 has a stepped diameter.

At an axial mid-portion, the shaft 66 is radially enlarged at 72 to define a polygonally-shaped perimeter surface 74 that nests in a matching receptacle 76 on the spool 24 and against a part of a surface 77 of the spool 24 bounding the bore 67 so that the spool 24 and shaft 66 are keyed to rotate together around the axis 52.

Axially oppositely facing, annular shoulders 78, 80, respectively on the spool 24 and shaft 66, abut to consistently maintain a predetermined axial relationship between the shaft 66 and spool 24 wherein a through opening/bore 82 in the shaft 66 aligns with the flange 56 to allow a single length of the line 28 to be directed radially into and through the bore 82. The line 28 projecting from one end of the bore 82 is wrapped in one direction around the core 26 within the line storage space 58. The line 28 projecting from the other end is wrapped oppositely around the core 26 within the line storage space 60.

With the first and second housing parts 20, 22 in their second state, as shown in FIG. 7, the spool 24 is captively maintained in its operative position. More specifically, the spool 24 is captively maintained between axially oppositely facing surfaces 84, 86, respectively on the first and second housing parts 20, 22.

The upper flange 62 has a plurality of the aforementioned components 48 projecting upwardly therefrom. The components 48 are spaced radially from the axis 52 and circumferentially around the axis 52 at regular intervals. Each component 48 has a ramp surface 88 and a blocking surface 90, as seen most clearly in FIG. 8.

The components 48 cooperate with the components 50 that extend downwardly from the housing part surface 84. The components 50 extend radially from the axis 52 with six such components 50 shown in the exemplary form. The components 48, 50 may be the same, or different, in number.

The components 50 reside in the path of the components 48 as the spool 24 is turned relative to the housing 18 around the axis 52.

The shaft 66 and spool 24 are urged axially upwardly by a biasing component in the form of a coil spring 92 that surrounds a reduced diameter portion 94 of the shaft 66 at its end 70. The reduced diameter portion 94 is guided vertically within a blind receptacle 96 bounded by a boss 97 on the housing part 22. The spring 92 fits within a separate, surrounding, annular receptacle 98 on the housing part 22, bounded by the first boss 97 and a second concentric boss 99, and is captive between a surface 100 on the housing part 22 and a shoulder 102 defined by a cap 104, surrounding the reduced diameter post portion 94 and nested at the juncture between the radially enlarged region at 72 and the reduced diameter portion 94. Thus, a constant bias force is normally produced by the spring 92 urging the shaft 66 and spool 24 axially upwardly to the position shown in FIG. 7.

With the spool 24 in this position, the blocking surfaces 90 on the components 48 axially overlap with blocking surfaces 106 on the components 50. The components 48, 50 are shown to be equal in number and arranged to cooperate simultaneously in the same manner. That is, as the spool 24 is turned in one direction, indicated by the arrow 108 in FIG. 8, the blocking surfaces 90, 106 abut to cause the first housing part 20 to turn therewith. As explained in greater detail below, the housing part 22 is connected to the housing part 20, to turn as one piece therewith.

By turning the spool 24 in the direction of the arrow 110 in FIG. 8, the ramp surfaces 88 are caused to engage edges 112 on the components 50, which produces a camming action that progressively moves the spool 24 and shaft 66 axially downwardly away from the housing part 20 against the force of the spring 92 until the components 48, 50 move past each other, whereupon the compressed spring 92 urges the spool 24 and shaft 66 axially upwardly into the FIG. 7 position. The relative turning of the spool 24 and housing 18 causes an unwinding of an increment of the line 28 in the line storage spaces 58, 60 so that free end portions 114, 116 of the line 28, that project through diametrically opposite housing openings 118, 120, project further outwardly to increase their cutting lengths.

The feeding out of the line 28 can be effected manually with the head 12 stationary, or through a bumping action with the head 12 turning in operation. In the former case, a graspable cap 122 is used to turn the unitary shaft 66. The cap 122 has an inverted cup shape to produce an umbrella shape over, and axially overlapping, the housing part 20. In a normal state for the head 12, a downwardly facing surface 124 on the cap 122 is spaced slightly above the top surface 126 of the housing part 20.

The cap 122 has a pair of posts 128, 130 which straddle a reduced diameter portion 132 of the shaft 66 at its end 68 and nest in complementary receptacles 134, 136 against the shaft 66. A snap fit connection can be effected as shown for exemplary post 128 in receptacle 134 so that the shaft follows turning movement of the cap 122. With the post 128 fully seated, an axially facing shoulder 138 thereon snaps under an axially oppositely facing shoulder 140 on the shaft 66. The post 130 may be snap fit in similar fashion into its receptacle 136.

By grasping and turning the cap 122 in one direction, the shaft 66 and spool 24 follow by moving in the direction of the arrow 110. The spool 24 can be continuously turned, moving axially upwardly and downwardly as the components 48, 50 repetitively interact and separate.

The head 12 is rotated by the drive 16 through a component 142 that engages a threaded bore 144 on the shaft 66 to make up the aforementioned connecting assembly 30. The thread direction is such that as the drive 16 is operated, this threaded connection is tightened. The axially upper end region of the shaft 66 defines a connecting part with threads that remain exposed to facilitate operative engagement of the drive 16 through the threaded component 142.

As the shaft 66 is driven, the shaft 66 drives the spool 24 which in turns drives the housing 18 through the cooperating components 48, 50. The rotational direction of the spool 24 is as indicated by the arrow 108 in FIG. 8, such that the blocking surfaces 90 on the components 48 engage and drive the blocking surfaces 106 on the components 50. The user can effect incremental line extension by tapping the bottom surface 146 of the housing part 22 against a hard surface as the housing 18 is rotating. As this occurs, the shaft 66 and spool 24 together move momentarily axially downwardly so as to compress the spring 92. This disengages the components 48, 50 until the restoring force in the compressed spring 92 returns the shaft 66 and spool 24 to their original upward positions.

The spool 24 is constructed so that it can be inverted to accommodate different drive directions for the trimmer head 12. The flange 64 has connectors 48' that are oppositely arranged but cooperate with the components 50 otherwise in the same fashion that the connectors 48 cooperate therewith.

The housing parts 20, 22 are maintained in their second, connected state by at least three pairs of the cooperating connectors 32, 34 at spaced locations and configured to produce a snap fit latching arrangement. Each of the locations is spaced: a) radially from the operating axis 52; and b) in a circumferential direction from the other locations. The first and second housing parts 20, 22, in the second state, are blocked by the cooperating connectors 32, 34 from moving axially away from each other.

Each connector 34 is in the form of a repositionable, cantilevered latch arm 148 with a leading cam surface 150. The arm 148 further has a surface/edge 152 facing in one axial direction. The arm 148 has a cam surface 153 that extends from the cam surface 150 up to the surface/edge 152.

Figure 9:
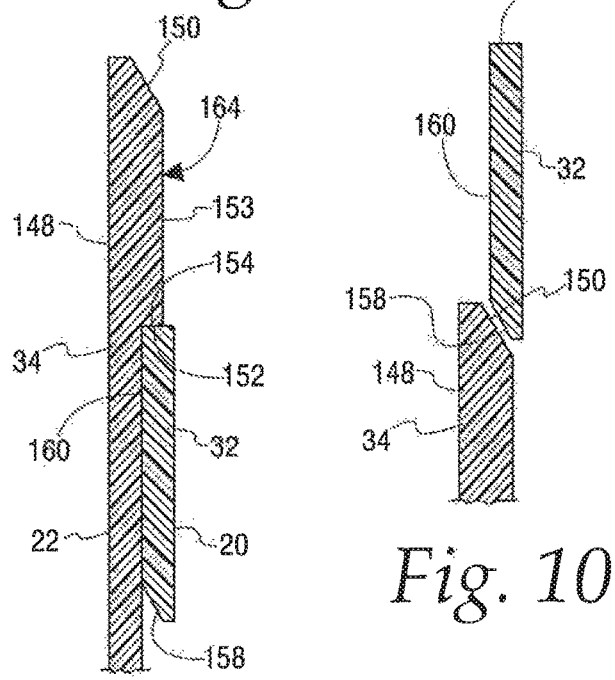
FIG. 9 is a fragmentary, cross-sectional view of one form of connector, shown schematically on one housing part in FIG. 1, taken along line 9-9 of FIG. 5, and a cooperating connector on the other housing part with the housing parts in an engaged state.

Each connector 32 has a surface/edge 154 facing axially oppositely to the surface/edge 152 with the housing parts 20, 22 in their second state, as shown in FIGS. 7 and 9. The connector 32 has a cam surface 158 that blends into a separate cam surface 160 that extends up to the surface/edge 154.

In the depicted embodiment, the connector pairs 32, 34 are provided at four circumferentially spaced locations L1, L2, L3, L4 on the head 12. Each of the cooperating connector pairs 32, 34 has the same construction with the connectors 32, 34 cooperating in the same fashion to cooperatively maintain the housing parts 20, 22 together in their second state.

Figure 11:
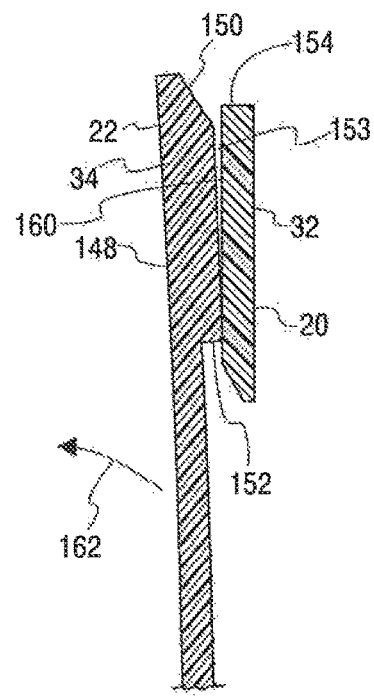
FIGS. 10 and 11 are schematic representations, corresponding to the view in FIG. 9, and showing the transition of the connectors in FIG. 9 into an engaged position.
Figure 10:
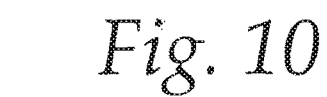
Figure 12:
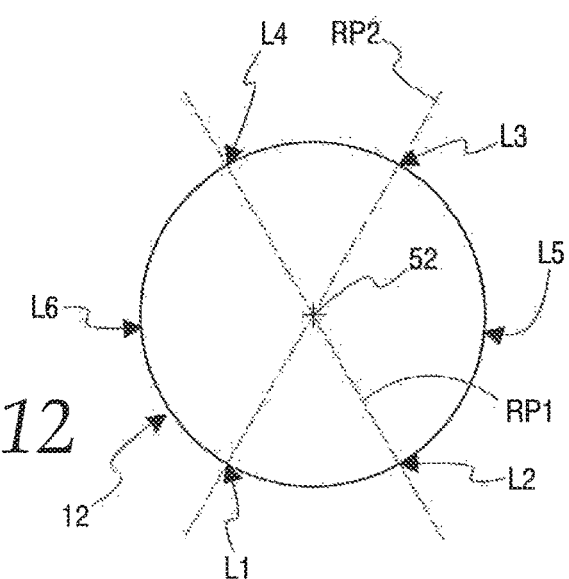
FIG. 12 is a reduced, schematic, plan view of the trimmer head in FIGS. 5-7.

As shown in FIGS. 10 and 11, with the housing parts 20, 22 initially in their first state and axially aligned as in FIG. 10, movement of the housing parts 20, 22 axially towards and against each other causes the cam surface 150 on each connector 34 to engage the cam surface 158 on the connector 32. As this relative movement continues, the cooperating cam surfaces 150, 158 cause the arm 148 to progressively bend radially inwardly, as indicated by the arrow 162. The bending of the arm 148 continues until the cam surface 153 comes into contact with the cam surface 160, as seen in FIG. 11. Continued relative movement, which is guided by the engaged cam surfaces 153, 160, causes the surfaces/edges 152, 154 to move towards each other and eventually past each other, whereupon the arm 148 springs radially outwardly to place the surfaces/edges 152, 154 in confronting/blocking relationship, as shown in FIG. 9.

With the housing parts 20, 22 in their second state, the free end region 164 of each arm 148 is exposed at an opening 166 on the housing part 20 such that a radially inward force can be applied thereagainst to bend the arm 148 radially inwardly to thereby move the surfaces/edges 152, 154 out of confronting relationship, whereby the housing parts 20, 22 can be separated.

With this arrangement, the housing parts 20, 22 can be axially aligned in their first state and pressed together to thereby be snap fit and latched/held together in their second state. Of course, the cooperating connector parts could be reversed, whereby the bendable arms 148 are on the housing part 20. Alternatively, one or more bendable arms may be provided on each of the housing parts 20, 22.

In the depicted form, the arms 148 are molded as one piece with a body 168 making up the remainder of the housing part 22. Both of the housing parts are preferably molded from a non-metal material such as a plastic, a composite, etc.

In the exemplary form, the connector pairs 32, 34 at the locations L1 and L3 are at diametrically opposite positions. Similarly, the connector pairs 32, 34 at the locations L2 and L4 are at diametrically opposite positions. The connector pairs 32, 34 at the locations L1 and L3 are symmetrical on opposite sides of a reference plane RP1, including the operating axis 52. The connector pairs 32, 34 at the locations L1 and L3 are likewise symmetrical about a separate reference plane RP2 including the operating axis 52. As depicted, these reference planes RP1, RP2 are non-orthogonal to each other.

Inserts 170 of like construction are placed within the housing 18 and actually define the openings 118, 120, which are at fifth and sixth diametrically opposite locations L5, L6.

In the depicted embodiment, the locations L1-L6 are spaced substantially uniformly from each other in a circumferential direction.

The housing part 22 has a series of cantilevered, axially projecting tabs 172, 174 that alternate around the circumference of the housing part 22. The tab 174 has a generally square shape, with the tab 172 having a slightly different polygonal shape.

The tabs 172, 174 are translatable into complementarily-shaped notches 176, 178, respectively, on the housing part 20. The tabs 172, 174 nest in their respective notches 176, 178 as the housing parts 20, 22 are changed from their first state into their second state. The tabs 172, 174 and cooperating notches 176, 178 are configured to cooperate to key the first and second housing parts 20, 22 against relative movement around the operating axis 52 at the circumferentially spaced locations at which the tabs 172, 174 and notches 176, 178 cooperate. As depicted, the tabs 172, 174 and notches 176, 178 alternate and are spaced approximately equidistantly around the circumference of the housing part 20.

With the housing parts 20, 22 operatively connected and the latch arms 148 snap fit into place, an edge 180 on the housing part 20 abuts to a facing edge 182 on the housing part 22. The edges 180, 182 follow the contours of their respective body parts around the tabs 172, 174 and notches 176, 178 to engage substantially fully and continuously around the axis 52. The edges 180, 182 preferably engage at least in the regions between where the connectors 32, 34 reside to stabilize the housing parts 20, 22 against tipping/skewing.

The unitary shaft 66 is preferably made from a metal material. By extending fully axially between, and connecting to, each of the first and second housing parts 20, 22, the shaft stabilizes the housing parts 20, 22 to thereby maintain a desired aligned relationship therebetween. By reason of the metal construction of the shaft 66, other cooperating parts of the housing 12, made from non-metal materials, are not prone to welding to the shaft 66 over time after extended use of the trimmer head 12.

The required rigidity for the shaft 66 can be achieved by making the shaft 66 as a single piece or from separate metal pieces that are fixedly connected. For example, the pieces might be welded.

In a preferred form, the shaft 66 is a single, machined piece. Of course, machining of a welded piece is also contemplated. Machining allows the shaft 66 to be precisely formed with close tolerances.

Weight can be controlled by using a lightweight metal such as aluminum.

Stability is enhanced by having an outer annular surface portion 184 at the top region of the shaft 66 engaged with a radially inwardly facing annular surface 186 over substantially the entire axial dimension of a boss 188 that locally thickens the upper wall 190 of the housing part 20.

The lower region of the shaft 66, the spool 24, and housing part 22 interact in a manner to likewise maintain alignment of the housing parts 20, 22 and their structural relationship with the spool 24.

The upwardly projecting bosses 97, 99 effectively thicken and rigidify the housing part 22 and further create enlarged contact areas between the housing part 22 and each of the shaft 66 and spool 24 to thereby stabilize the relationship between these components and positively guide their relative movement.

More specifically, the boss 97 defines a radially inwardly facing annular surface 191 that cooperates with a radially outwardly facing surface portion 192 on the reduced diameter portion 94 of the shaft 66. The shaft 66 thus translates axially and turns around the axis 52 smoothly relative to the housing part 22 while stably maintaining the relationship of the housing part 22 to the operating axis 52. A radially outwardly facing surface 194 on the boss 97 supports the coil spring 92 that extends therearound.

The spool 24 in turn is stably supported for guided movement relative to the second housing part 22 by the boss 99. The boss 99 has a radially outwardly facing annular surface 196 that bears against a radially inwardly facing annular surface 198 on the bottom portion of the spool 24. This arrangement stabilizes the spool 24 and smoothly guides movement of the spool 24 both axially relative to the second housing part 22 and as it turns relative to the housing part 22 around the axis 52.

The mid to upper region of the spool 24 conforms closely to the shaft 66 and is thus stably supported directly by the shaft 66 in that region.

Thus, the housing parts 20, 22 are stably supported by the rigid metal shaft 66, with additional stabilizing of the relationship of the housing parts 20, 22 and shaft 66 afforded by the spool 24 interacting primarily between the shaft 66 and housing part 22.

With a precisely formed metal shaft 66 defining the structural foundation for the other components on the trimmer head 12, the number of interacting parts can be reduced. Detrimental stacking of tolerances may thus be avoided, as is a resulting imbalanced stack-up. Consistent, balanced alignment of parts may be maintained for the useful life expectancy for the trimmer head 12.

With the above described arrangement, the three or more connecting locations L1-L4 stabilize the housing parts 20, 22 against tipping relative to each other, thereby to further maintain overall balance and parts alignment. The latch locations could exceed the four shown.

As noted in the Background Art section herein, another contributor to imbalance is the use of a fixed forming unit/mold construction for the trimmer head parts/components, particularly the first and second housing parts 20, 22. In spite of steps taken to engineer forming units/molds so that the housing parts 20, 22 are precisely formed to be dynamically balanced, molding of non-metal materials inherently introduces variables that may result in shifting of masses on parts, that may be aggravated as the forming units/molds are repeatedly used and worn and reconfigured over time.

This imbalance problem is further aggravated by the fact that conventional housing parts are generally made to be joined together in more than one relationship. For example, commonly with an arrangement of two latch connection locations, for the convenience of a user, the cooperating latch components are configured to cooperate with the housing parts in each of two different angular relationships. That is, the first and second housing parts can be snap fit together in one relationship and similarly snap fit together with one of the housing parts turned through 180° relative to the other housing part around the rotary axis for the trimmer head.

The inventive housing 18, as described above, may also be constructed with a symmetrical arrangement which allows the cooperating latch components on the housing parts 20, 22 to be aligned with the housing parts 20, 22 in a least two different angular relationships.

Figure 13:
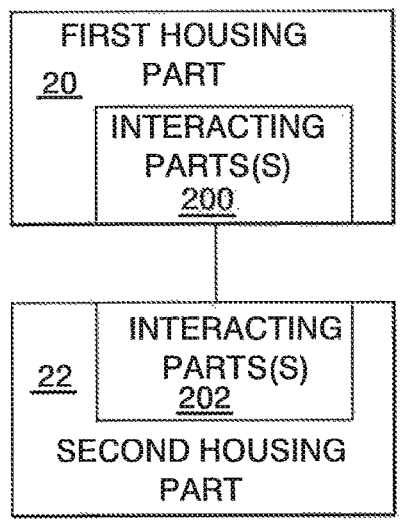
FIG. 13 is a schematic representation of interacting parts on the first and second housing parts that allow the housing parts to be joined in only one angular relationship.

To avoid this latter problem, as shown in FIG. 13, the first housing part 20 and second housing part 22 may respectively be provided with one or more interacting parts 200, 202 that that are configured to allow the housing parts 20, 22 to be joined in only a single angular relationship.

A multitude of different forms of interacting parts 200, 202 may be devised. The schematic showing of the interacting parts 200, 202 is intended to encompass all such variations, including the interacting parts on the exemplary form of the housing 18 described herein.

Figure 14:
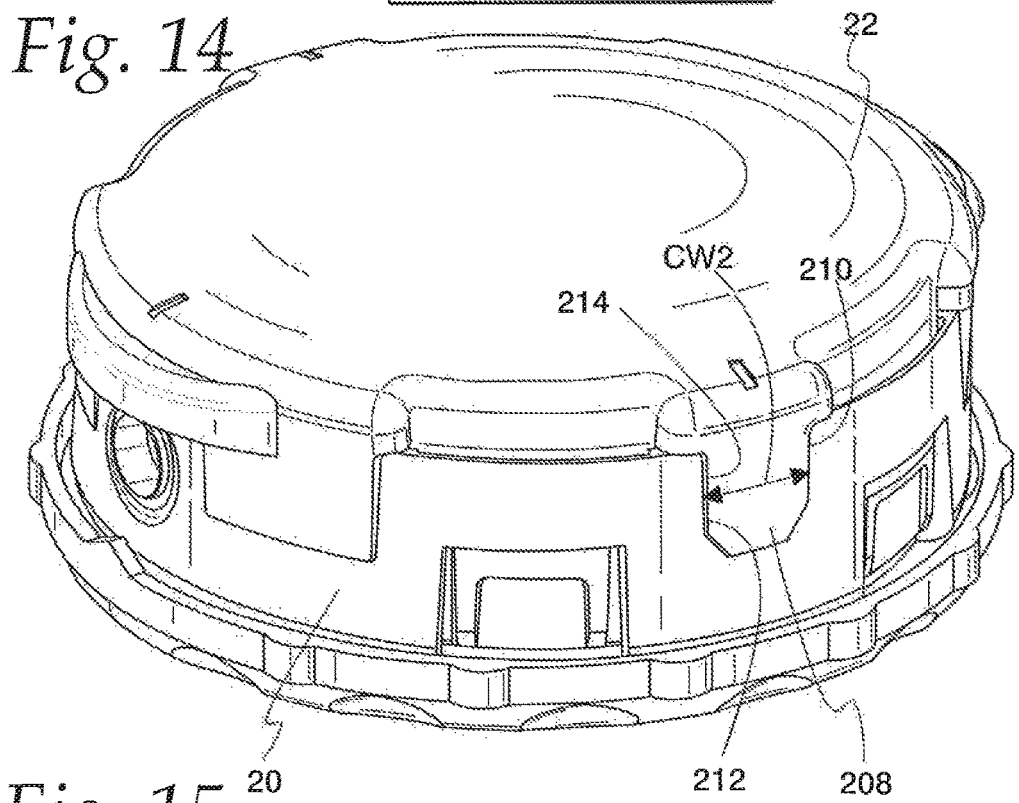
FIG. 14 is a reduced view as in FIG. 6 from a diametrically opposite perspective.

More specifically, as seen in FIGS. 5, 6, and 14, the tab 172 on the housing part 22 performs the function of one of the interacting parts 202 shown in FIG. 13, with the complementary edge 204 bounding the notch 176 functioning as one of the interacting parts 200. The tab 172 has a peripheral edge 206 matched to the shape of the edge 204 so that the tab 172 can be moved axially to be press fit into the notch 176.

At the diametrically opposite location, as shown in FIG. 14, the tab 208, functioning as one of the interacting parts 202 on the housing part 22, has a truncated, rectangular shape, with a peripheral edge 210 that seats against a complementarily-shaped edge 212, bounding a notch 214 on the housing part 20 and functioning as one of the interacting parts 200.

Aside from the tabs 172, 208 having a different shape, as shown, that might prevent full axial seating, they also have different circumferential widths, CW1, CW2, respectively. Accordingly, the tab with the larger circumferential width, in this case the tab 172, cannot be pressed into the notch 214.

Thus, the housing parts 20, 22 can be assembled in only one angular relationship. As a result, in designing the housing parts 20, 22, they can be precisely dimensioned to produce optimal balance without having to take into account two alternative relationships of the housing parts 20, 22 that may introduce mass shifting that causes a dynamic imbalance.

To further enhance balance, one or both of the housing parts may be made in a manner whereby the mass of a moldable material can be controllably changed within a fixed cavity, potentially allowing components with different mass distributions to be produced using the same mold cavity.

Figure 15:
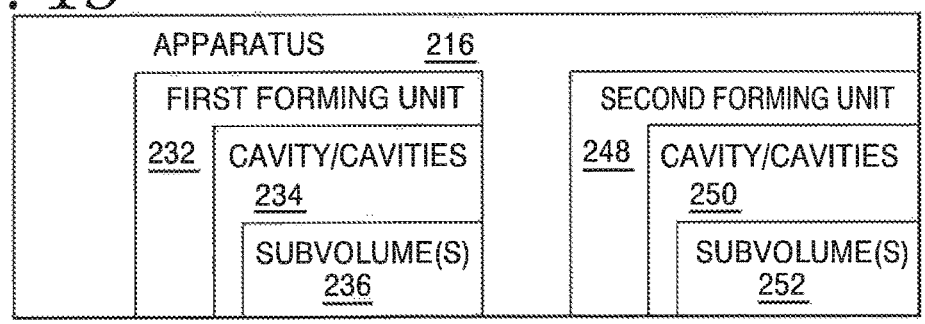
FIG. 15 is a schematic representation of an apparatus for forming components/parts making up at least part of a housing on a trimmer head, according to the invention, and including at least one forming cavity in which the components/parts are formed.
Figure 18:
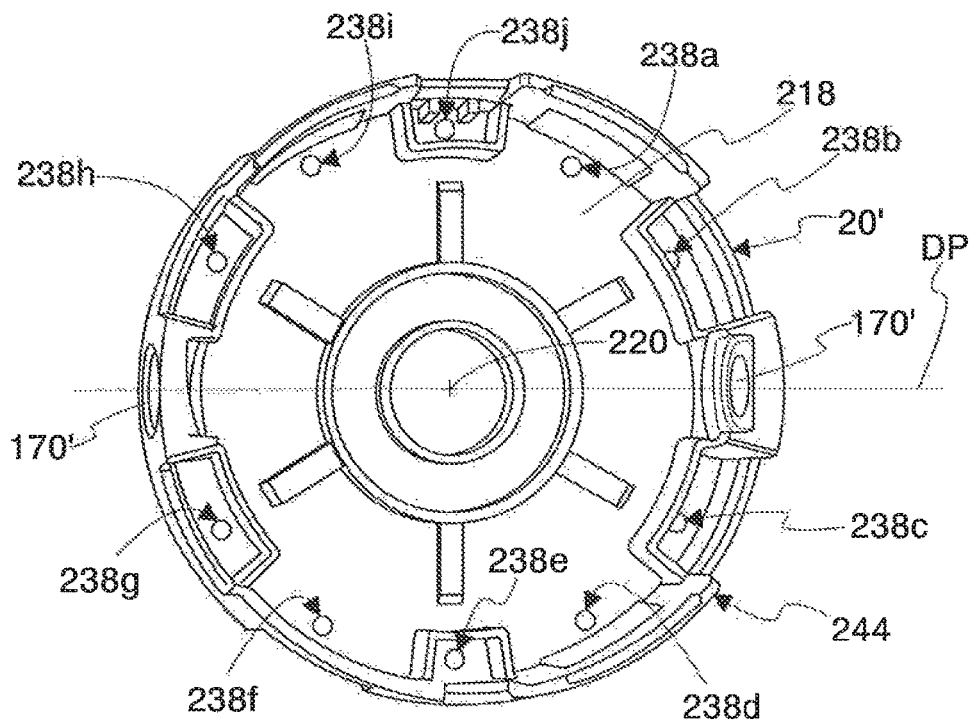
FIG. 18 is a bottom view of a housing part made using the apparatus in FIG. 15.
Figure 19:
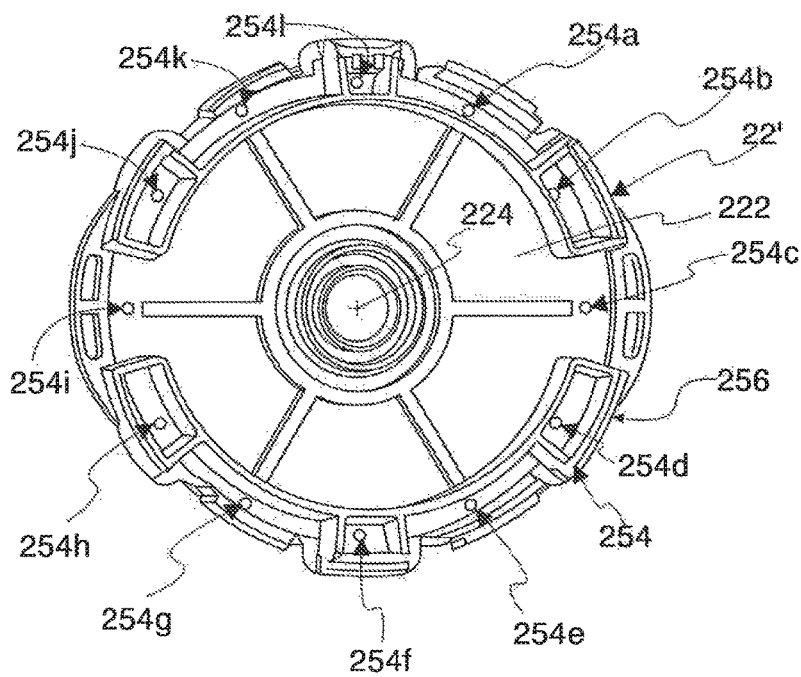
FIG. 19 is a top view of a housing part, made using the apparatus in FIG. 15, and configured to be connected to the housing part in FIG. 18.

As shown schematically in FIG. 15, such an apparatus 216 is designed for forming at least a first component making up at least a part of a housing on a trimmer head. The apparatus 216 will be described as used to make part or all of the housing parts 20, 22 which, as made using the apparatus 216, will be identified hereinbelow as generally cup-shaped housing parts 20', 22', as seen in FIGS. 18 and 19. However, the apparatus 216 might be used to form part or all of any component on a trimmer head of the type described herein.

The housing part 20' has a wall 218 that extends continuously around a central axis 220. The housing part 22' has a wall 222 extending continuously around a central axis 224, that is substantially coincident with the axis 220 with the housing parts 20', 22' operatively connected.

Figure 20:
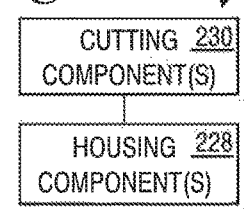
FIG. 20 is a schematic representation of a trimmer head with housing components that can be made using the apparatus in FIG. 15.

While the invention will be described hereinbelow with respect to one exemplary form, as shown in FIG. 20, the inventive concepts are contemplated for use with any trimmer head 226 with one or more housing components 228 upon which at least one cutting component 230 is supported that effects cutting as the housing on the trimmer head 226 is turned around a rotary axis. The cutting component(s) may have any number of different forms, including a projecting length from a wrapped supply of flexible line, as described above, or another construction, including but not limited to individual cutting strands or components that project at one or more discrete locations from the housing.

The apparatus 216 consists of a first forming unit/mold 232 defining at least one cavity 234 within which a moldable material is confined to produce at least a part of the wall 218 on the housing part 20' or the wall 222 on the housing part 22'. For purposes of simplicity, the apparatus 216 will be initially described with respect to how it is used to form the housing part 20', with it being understood that either or both of the housing parts 20', 22' may be made in substantially the same manner using the apparatus 216.

The first forming unit 232 is configured to allow selective controlling of a quantity of a moldable material introduced into a first discrete subvolume 236 at a first location in the cavity 234 to thereby allow selective controlling of a mass of a portion of the wall 218 formed by the moldable material in the cavity 234 at the first location to facilitate dynamic balancing of a housing made up in part of the housing part 20'.

The cavity 234 has a shape to confine moldable material to produce the shape of the housing part 20' in FIG. 18.

As depicted, the first forming unit 232 is configured to allow selective controlling of a quantity of moldable material into a plurality of discrete subvolumes within the cavity 234 with locations corresponding to locations for the subvolume(s) 236 identified as 238a-238j on the completed housing part 20'.

Figure 16:
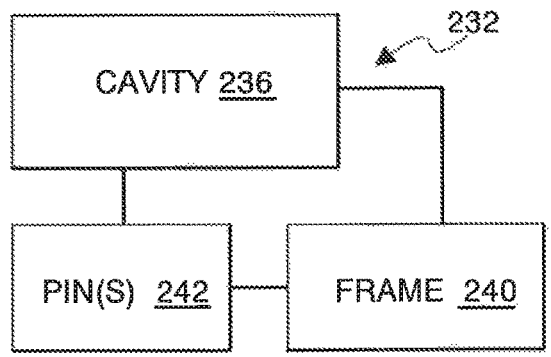
FIG. 16 is a schematic representation showing certain details of the forming unit on the apparatus in FIG. 15.

The housing part 20' has substantially the same configuration as the housing part 20, with the primary difference being that at the discrete locations 238a-238j there may be different quantities of the moldable material, selectively controlled as by an exemplary forming unit structure shown in FIG. 16.

As depicted, the forming unit 232 has a frame 240 on which the cavity 234 is formed. One or more pins 242 is mounted to the frame 240 for movement into and out of the cavity 234. With the pin 242 extended fully into the cavity 234, the pin occupies one subvolume within which moldable material in the cavity 234 cannot occupy. By strategically withdrawing the pin 242, it occupies a smaller subvolume. The opened portion of the one subvolume, resulting from the pin withdrawal, can be filled by the mold material in the cavity 234. Thus, at each location, a discrete mass of the wall 218 can be controlled to thereby facilitate dynamic balancing of the trimmer head housing into which the housing part 20' is incorporated.

Of course, other structures for controlling introduction of moldable material into a cavity at discrete locations are contemplated.

While the first forming unit 232 may be configured to allow controlling of a quantity of moldable material introduced into but a single discrete subvolume 236 at a first location, preferably the first forming unit 232 is configured to allow selective controlling of a quantity of moldable material introduced into at least two discrete subvolumes, as at diametrically opposite locations.

An exemplary form of the first forming unit 232 is configured to allow selective controlling of moldable material introduced into discrete subvolumes at ten spaced locations to produce the housing part 20' in FIG. 18. As depicted, the arrangement of the locations 238 is symmetrical about a dividing plane DP including the axis 220 and extending through the centers of the diametrically opposite line accommodating inserts 170'.

The locations 238a-238j are adjacent to the perimeter 244 of the housing part 20' to maximize moment arm and balancing effect.

On each side of the plane DP, the locations 238 are equidistantly spaced from each other in a circumferential direction.

It is preferred that there be at least eight such locations/discrete subvolumes 236 in the cavity 234.

As shown in FIG. 15, a second forming unit 248 is provided to produce the housing part 22', as shown in FIG. 19. The second forming unit 248 has the same general construction as the first forming unit 232, with at least one cavity 250 within which a moldable material is confined to produce at least a part of the wall 222. The second forming unit 248 is configured to allow selective controlling of a quantity of moldable material into at least one, and preferably multiple, subvolumes 252 at spaced locations in the cavity 250, which correspond to locations 254a-254l on the housing part 22' formed by the second forming unit 248.

The second forming unit 248 may be a separate structure, or part of the apparatus 216, including the first forming unit 232.

As depicted, the housing part 22' has twelve locations 254a-254j spaced around the axis 224 and adjacent to the perimeter 256 of the housing part 22'. Each of the locations 254a-254l is shown spaced equidistantly from two other locations. While a single location 254 may be provided, preferably multiple locations, and more preferably at least eight in number, are provided.

While the locations 238, 254 are shown radially spaced the same distance from their respective axis 220, 224, this is not a requirement.

Figure 17:
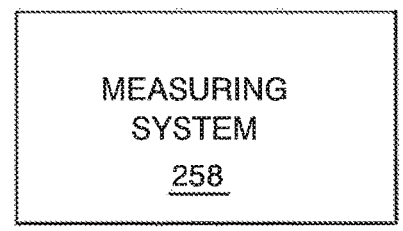
FIG. 17 is a schematic representation of a measuring system utilized to analyze balance of housing components/parts.

As shown in FIG. 17, the housing parts 20', 22' can be analyzed through a conventional-type measuring system 258. The measuring system 258 allows analysis of the mass balance around the rotary operating axis for the head. The measuring system 258 can be utilized to identify at which locations, if any, change in mass distribution is warranted in either of the cavities 234, 250 on its respective forming unit 232, 248.

Measuring systems 258 currently exist in the form of machines that can detect angle and force of where an imbalance exists.

Housing parts 20', 22' may be analyzed independently or connected to each other and/or other housing parts/components utilized. The analysis may be carried out both on the individual parts/components and on a completed trimmer head unit into which the individually analyzed parts/components are incorporated.

A housing can be made using both of the components 20', 22' as depicted. Alternatively, either of the housing parts 20', 22' might be combined with another housing part that does not have the dynamic balancing feature incorporated.

Figure 21:
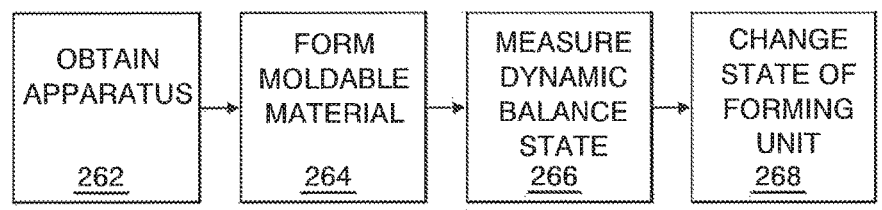
FIG. 21 is a flow diagram representation of a method of making at least a part of a trimmer head housing, according to the invention.

As shown in flow diagram form in FIG. 21, a method of making at least a part of a trimmer head housing may be carried out as follows.

As shown at block 262, an apparatus as described above is obtained.

As shown at block 264, a moldable material is formed in at least one cavity of a first forming unit with the first forming unit in a first state, wherein a first discrete subvolume is configured to receive either: a) no moldable material; or b) a first quantity of moldable material to produce one form of a first component.

As shown at block 266, a dynamic balance state of the one form of the first component is measured with respect to its central axis.

As shown at block 268, based upon the measured dynamic balance state of the one form of the first component, the first forming unit 232 is changed from the first state into a second state wherein the first discrete subvolume is configured to receive a different quantity of moldable material than received with the first forming unit in the first state, to thereby produce a second form of the first component.

With the first forming unit in the second state, components/parts can be formed and in turn analyzed, as using a measuring system, as described above. Identified imbalances may dictate a further change of the state of the first forming unit.

As noted above, after forming the one form of the first housing component, the same can be combined with at least one other component before being analyzed using the described measuring system.

The method described above is carried out in the same manner using a second, different forming unit to produce a second component that has different forms depending upon the state of the second forming unit. The state is changed by controlling the quantity of moldable material that can be introduced into subvolumes at various locations within the forming cavity.

The foregoing disclosure of specific embodiments is intended to be illustrative of the broad concepts comprehended by the invention.

The invention claimed is:

1. A method of making at least a part of a trimmer head housing, the method comprising the steps of:
   obtaining an apparatus for forming a first component making up at least a part of a housing on a trimmer head, the housing having a rotary axis and configured to support at least one radially projecting cutting component that effects cutting as the housing is turned around the rotary axis, the first component having a central axis, the apparatus comprising:
      a first forming unit defining at least one cavity within which a moldable material is confined to produce at least a part of a wall on the first component that extends around the rotary axis,
      the first forming unit configured to allow selective controlling of a quantity of a moldable material introduced into a first discrete subvolume at a first location in the one cavity to thereby allow selective controlling of a mass of a portion of the at least part of the wall formed by the moldable material in the one cavity at the first location to facilitate dynamic balancing of the housing within which the first component is incorporated with respect to the rotary axis;
   forming a moldable material in the at least one cavity with the first forming unit in a first state wherein the first discrete subvolume receives either: a) none of the moldable material; or b) a first quantity of the moldable material to produce one form of the first component;
   measuring a dynamic balance state of the one form of the first component with respect to the central axis of the one form of the first component; and
   based upon the measured dynamic balance state of the one form of the first component, either: a) leaving the first forming unit in the first state; or b) changing the first forming unit from the first state into a second state wherein the first discrete subvolume receives a different quantity of the moldable material than received with the first forming unit in the first state to thereby produce a second form of the first component.

2. The method of making at least a part of a trimmer head housing according to claim 1 further comprising the step of combining the one form of the first component with at least one other component forming a part of the trimmer head and the step of measuring a dynamic balance state of the one form of the first component comprises measuring a dynamic balance state of the one form of the first component with the one form of the first component combined with the at least one other component.

3. The method of making at least a part of a trimmer head housing according to claim 1 further comprising the steps of:
   obtaining a second forming unit defining at least a second cavity within which a moldable material is confined to produce at least a part of a wall on a second component having a central axis, the second forming unit configured to allow selective controlling of a quantity of moldable material into a first discrete subvolume at a first location in the second cavity to thereby allow selective controlling of a mass of a portion of at least part of the wall formed by the moldable material in the second cavity at the first location in the second cavity to facilitate dynamic balancing of the housing within which the second component is incorporated with respect to the rotary axis, the first and second forming units configured so that the first and second components are configured to be joinable to each other to make up at least a part of the trimmer head housing;
   forming a moldable material in the at least second cavity with the second forming unit in a first state wherein the first discrete subvolume in the second cavity receives either: a) none of the moldable material; or b) a second quantity of moldable material to produce one form of the second component;
   measuring a dynamic balance state of the one form of the second component with respect to the central axis of the one form of the second component; and
   based upon the measured dynamic balance state of the one form of the second component, either: a) leaving the second forming unit in its first state; or b) changing the second forming unit from its first state into a second state wherein the first discrete subvolume in the second cavity receives a different quantity of moldable material than received in the first discrete subvolume in the second cavity with the second forming unit in its first state to thereby produce a second form of the second component.

4. The method of making at least a part of a trimmer head housing according to claim 3 further including the step of operatively joining the first form of the first component and the first form of the second component and the step of measuring the dynamic balance states of the one form of the first component and one form of the second component comprises measuring the dynamic balance states with the one form of the first component and one form of the second component separated from each other.

5. The method of making at least a part of a trimmer head housing according to claim 3 further including the step of operatively joining the first form of the first component and the first form of the second component and the step of measuring the dynamic balance states of the one form of the first component and one form of the second component comprises measuring the dynamic balance states with the one form of the first component and one form of the second component operatively joined to each other.

* * * * *